(12) United States Patent
Niino et al.

(10) Patent No.: US 10,099,691 B2
(45) Date of Patent: Oct. 16, 2018

(54) APPARATUS AND PROGRAM FOR ASSISTING DRIVE OF VEHICLE

(71) Applicant: DENSO CORPORATION, Kariya, Aichi-pref. (JP)

(72) Inventors: Hiroaki Niino, Toyota (JP); Masao Oooka, Gamagori (JP); Shotaro Fukuda, Obu (JP); Takahiro Narita, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/838,592

(22) Filed: Dec. 12, 2017

(65) Prior Publication Data

US 2018/0099668 A1    Apr. 12, 2018

Related U.S. Application Data

(63) Continuation of application No. 14/724,891, filed on May 29, 2015, now Pat. No. 9,878,712.

(30) Foreign Application Priority Data

May 30, 2014    (JP) .................................. 2014-112904

(51) Int. Cl.
    *B60W 30/16*    (2012.01)
(52) U.S. Cl.
    CPC ......... *B60W 30/16* (2013.01); *B60W 2520/10* (2013.01); *B60W 2550/142* (2013.01);
    (Continued)
(58) Field of Classification Search
    CPC ............ B60W 30/16; B60W 2550/30; B60W 2550/10; B60W 2550/308;
    (Continued)

(56) References Cited

U.S. PATENT DOCUMENTS 4,703,429 A  * 10/1987  Sakata ............... B60K 31/0008
                                                         180/169
5,661,650 A  *  8/1997  Sekine .................... B62D 1/28
                                                         340/438
(Continued)

FOREIGN PATENT DOCUMENTS

DE    102013216370 A1    2/2014
JP      2002137652 A    5/2002
(Continued)

OTHER PUBLICATIONS

Novel boundary determination algorithm for lane detection; Shan-Chun Tsai et al.; 2013 International Conference on Connected Vehicles and Expo (ICCVE); Year: 2013 pp. 598-603.*

(Continued)

*Primary Examiner* — Cuong H Nguyen
(74) *Attorney, Agent, or Firm* — Harness, Dickey & Pierce, P.L.C.

(57) ABSTRACT

In an apparatus, a first obtainer obtains a first travelling-condition parameter of a target vehicle. The first travelling-condition parameter shows one or more conditions under which the target vehicle is travelling on the road. A second obtainer obtains a second travelling-condition parameter of a preceding vehicle travelling on the road immediately ahead of the target vehicle. The second travelling-condition parameter shows one or more conditions under which the preceding vehicle is travelling on the road. A deviation calculator calculates a deviation between the first and second travelling-condition parameters. A behavior deter miner determines a recommended behavior of the target vehicle in response to the calculated deviation. A controller controls a device, which is associated with a behavior of the target vehicle, according to the recommended behavior.

5 Claims, 3 Drawing Sheets

(52) U.S. Cl.
CPC ... *B60W 2550/146* (2013.01); *B60W 2550/30* (2013.01); *B60W 2550/302* (2013.01); *B60W 2550/308* (2013.01); *B60W 2550/402* (2013.01)

(58) Field of Classification Search
CPC ..... B60W 2550/402; B60W 2550/146; B60W 2550/302; B60W 2550/142
USPC .......... 701/96, 117, 122; 180/170; 340/435, 340/903
See application file for complete search history.

(56) References Cited

U.S. PATENT DOCUMENTS

| | | | | |
|---|---|---|---|---|
| 6,301,532 | B1 * | 10/2001 | Kull | B62D 15/0245 701/301 |
| 6,721,645 | B2 * | 4/2004 | Lueder | B60K 31/0008 701/93 |
| 6,763,904 | B2 * | 7/2004 | Winner | B60K 31/0008 180/167 |
| 6,917,872 | B2 | 7/2005 | Egami | |
| 6,973,380 | B2 | 12/2005 | Tange et al. | |
| 6,982,647 | B2 | 1/2006 | Kuge et al. | |
| 7,162,361 | B2 * | 1/2007 | Heinrichs-Bartscher | B60K 31/0008 180/170 |
| 7,359,788 | B2 | 4/2008 | Arai | |
| 8,818,680 | B2 | 8/2014 | Isaji et al. | |
| 8,855,860 | B2 * | 10/2014 | Isaji | B62D 6/00 340/435 |
| 8,972,147 | B2 * | 3/2015 | Taneyhill | B60K 31/0008 701/301 |
| 9,061,590 | B2 * | 6/2015 | Kurumisawa | B60K 31/00 |
| 9,269,264 | B2 | 2/2016 | Shimizu et al. | |
| 9,302,673 | B2 | 4/2016 | Sakima et al. | |
| 9,669,872 | B2 | 6/2017 | Rebhan et al. | |
| 2002/0069010 | A1 | 6/2002 | Nishira et al. | |
| 2002/0138192 | A1 * | 9/2002 | Lueder | B60K 31/0008 701/93 |
| 2003/0233187 | A1 | 12/2003 | Egami | |
| 2005/0143895 | A1 | 6/2005 | Kato | |
| 2005/0216180 | A1 | 9/2005 | Heinrichs-Bartscher | |
| 2012/0176234 | A1 * | 7/2012 | Taneyhill | B60K 31/0008 340/453 |
| 2013/0030688 | A1 | 1/2013 | Shimizu et al. | |
| 2013/0158830 | A1 * | 6/2013 | Kurumisawa | B60K 31/00 701/96 |
| 2014/0058579 | A1 | 2/2014 | Ono | |
| 2015/0175163 | A1 * | 6/2015 | Taneyhill | B60K 31/0008 701/96 |
| 2015/0197249 | A1 | 7/2015 | Sakima et al. | |
| 2015/0307100 | A1 | 10/2015 | Shimizu et al. | |
| 2015/0344033 | A1 | 12/2015 | Fukuda et al. | |

FOREIGN PATENT DOCUMENTS

| | | | | |
|---|---|---|---|---|
| JP | 2003016593 A | * | 1/2003 | ............. G08G 1/167 |
| JP | 2005186813 A | | 7/2005 | |
| JP | 2007145201 A | | 6/2007 | |
| JP | 2008-252544 | * | 9/2008 | ............. B60W 30/09 |
| JP | 2009-248892 A | | 10/2009 | |
| JP | 4434095 B2 | * | 3/2010 | ............... B62D 6/00 |
| JP | 2014041556 A | | 3/2014 | |
| JP | 2016079949 A | * | 5/2016 | ............. B29C 33/76 |
| WO | WO-2011125393 A1 | | 10/2011 | |
| WO | WO-2015033741 A1 | | 3/2015 | |

OTHER PUBLICATIONS

On the Optimal Speed Profile for Eco-Driving on Curved Roads; Feng Ding; Hui Jin; IEEE Transactions on Intelligent Transportation Systems; Year: 2018, ( Early Access ) pp. 1-11.*

Trajectory Planning for Autonomous Ground Vehicles Driving in Structured Environments Chao Li et al.; 2017 9th International Conference on Intelligent Human-Machine Systems and Cybernetics (IHMSC); Year: 2017, vol. 2; pp. 41-46.*

Road curvature estimation using a new lane detection method; Chengxiong Jin et al.; 2017 Chinese Automation Congress (CAC); Year: 2017; pp. 3597-3601; IEEE Conferences.*

Safe Optimization of Highway Traffic With Robust Model Predictive Control-Based Cooperative Adaptive Cruise Control; Carlos Massera Filho; Marco H. Terra; Denis F. Wolf; IEEE Transactions on Intelligent Transportation Systems; Year: 2017, vol. PP, Issue: 99; pp. 1-11.

Efficient control of vehicles in congested traffic using model predictive control; M. A. S. Kamal; Imura; A. Ohata; T. Hayakawa; K. Aihara; 2012 IEEE International Conference on Control Applications; Year: 2012; pp. 1522-1527.

Investigation of the Behavior of Adaptively Controlled Platoons with Unmodeled Loads; Jozsef Tar; Katalin Lorincz; Krishnan Agbemasu; Laszlo Nadai; Roland Kovacs; 2007 International Symposium on Logistics and Industrial Informatics; Year: 2007 pp. 137-142.

The Development and Application of ACC System; Ning Bian; Jifeng Liu; Jiangwei Du; Shun Guo; Yanding Yang; Ji Chen; Tingting Shi; Zhi Yue; 2014 Sixth International Conference on Measuring Technology and Mechatronics Automation; Year: 2014 pp. 692-695.

* cited by examiner

APPARATUS AND PROGRAM FOR ASSISTING DRIVE OF VEHICLE

CROSS REFERENCE TO RELATED APPLICATION

This application is a continuation Application of U.S. patent application Ser. No. 14/724,891 filed on May 29, 2015 which claims the benefit of priority from Japanese Patent Application No. 2014-112904 filed on May 30, 2014, which are incorporated in their entirety herein by reference.

TECHNICAL FIELD

The present disclosure relates to apparatuses and programs for assisting driver's drive of vehicles.

BACKGROUND

An example of these apparatuses is disclosed in Japanese Patent Application Publication No. 2005-186813, which will be referred to as patent document 1.

The apparatus disclosed in the patent document 1 sets a target speed of a vehicle assisted thereby according to an inter-vehicle distance of the assisted vehicle with respect to a preceding vehicle. The apparatus also estimates the slope, i.e. the gradient or inclination, of a road surface, on which the assisted vehicle is running, according to the driving conditions of the assisted vehicle. Then, the apparatus performs a drive-assist task that corrects the target speed of the assisted vehicle according to the estimated gradient of the road surface. This keeps a suitable inter-vehicle distance of the assisted vehicle with respect to a preceding vehicle.

SUMMARY

Change of the slope of a road surface may cause change of the speed of a preceding vehicle travelling ahead of a vehicle assisted by the apparatus disclosed in the patent document 1, resulting in change of an inter-vehicle distance of the assisted vehicle with respect to the preceding vehicle. The apparatus therefore requires a drive-assist task to change of the target speed of the assisted vehicle to follow the change of the inter-vehicle distance of the assisted vehicle with respect to the preceding vehicle. This may result in a delay between change of the inter-vehicle distance of the assisted vehicle with respect to the preceding vehicle and the drive-assist task of the assisted vehicle.

In view the circumstances set forth above, one aspect of the present disclosure seeks to provide apparatuses and computer programs for assisting a driver's driving of vehicles, which are capable of addressing the problem set forth above.

Specifically, an alternative aspect of the present disclosure aims to provide such apparatuses and programs, each of which is capable of preventing the occurrence of a delay between change of an inter-vehicle distance of a corresponding vehicle with respect to a preceding vehicle and a drive-assist task of the corresponding vehicle.

According to a first exemplary aspect of the present disclosure, there is provided an apparatus for assisting drive of a target vehicle travelling on a road using a device associated with a behavior of the target vehicle. The apparatus includes a first obtaining unit that obtains a first travelling-condition parameter of the target vehicle. The first travelling-condition parameter shows one or more conditions under which the target vehicle is travelling on the road. The apparatus includes a second obtaining unit that obtains a second travelling-condition parameter of a preceding vehicle travelling on the road immediately ahead of the target vehicle. The second travelling-condition parameter shows one or more conditions under which the preceding vehicle is travelling on the road. The apparatus includes a deviation calculator that calculates a deviation between the first travelling-condition parameter and the second travelling-condition parameter. The apparatus includes a behavior determiner that determines a recommended behavior of the target vehicle in response to the calculated deviation. The apparatus includes a controller that controls the device according to the recommended behavior.

According to a second exemplary aspect of the present disclosure, there is provided a computer program product for an apparatus for assisting drive of a target vehicle traveling on a road using a device associated with a behavior of the target vehicle. The computer program product includes a non-transitory computer-readable storage medium, and a set of computer program instructions embedded in the non-transitory computer-readable storage medium. The instructions cause a computer to carry out (1) A first step of obtaining a first travelling-condition parameter of the target vehicle, the first travelling-condition parameter showing one or more conditions under which the target vehicle is travelling on the road (2) A second step of obtaining a second travelling-condition parameter of a preceding vehicle travelling on the road immediately ahead of the target vehicle, the second travelling-condition parameter showing one or more conditions under which the preceding vehicle is travelling on the road (3) A third step of calculating a deviation between the first travelling-condition parameter and the second travelling-condition parameter (4) A fourth step of determining a recommended behavior of the target vehicle in response to the calculated deviation (5) A fifth step of controlling a device associated with a behavior of the target vehicle according to the recommended behavior.

Calculating the deviation between the at least one first driving condition parameter and the corresponding at least one second driving-condition parameter enables the controller or the computer to predict a situation where an inter-vehicle distance between the target vehicle and the preceding vehicle is likely to change before the inter-vehicle distance actually changes. Determining a recommended behavior of the target vehicle based on the deviation, i.e. the predicted situation, reduces a delay between change of the inter-vehicle distance and an action of the target vehicle based on the recommended behavior of the target vehicle.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
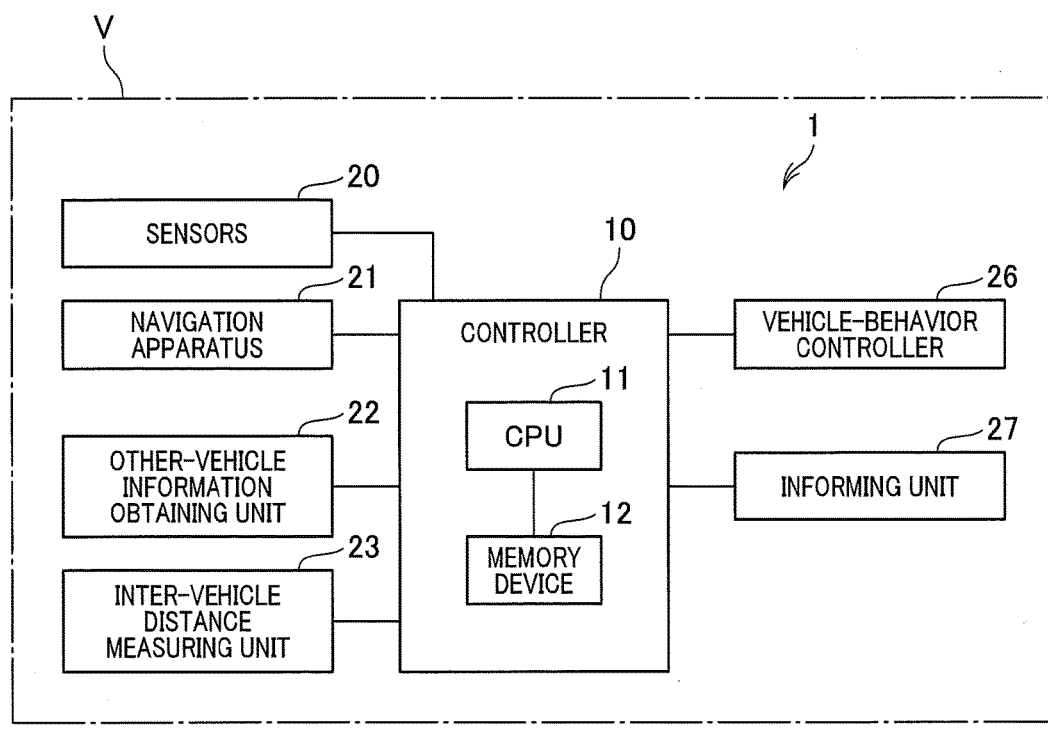
FIG. 1 is a block diagram schematically illustrating an example of the overall structure of a drive assist system installed in a vehicle according to an embodiment of the present disclosure.

A specific embodiment of the present disclosure will be described hereinafter with reference to the accompanying drawings. In this embodiment, like parts between the embodiments, to which like reference characters are assigned, are omitted or simplified to avoid redundant description.

A drive assist system, to which an apparatus according to this embodiment is applied, is installed in a vehicle, i.e. an own vehicle, a self-vehicle, or a target vehicle. For example, a passenger vehicle is used as the vehicle V. The drive assist system 1 has functions of assisting a driver's driving of the vehicle V travelling a lane of a road.

In particular, the drive assist system 1 is operative to predict change in the speed of a preceding vehicle travelling on the same lane immediately ahead of the vehicle V. Then, the drive assist system 1 is operative to assist the driver's driving of the vehicle V according to the predicted change in the speed of the preceding vehicle.

Referring to FIG. 1, the drive assist system 1 includes a controller 10, sensors 20, a navigation apparatus 21, an other-vehicle information obtaining unit 22, an inter-vehicle distance measuring unit 23, a vehicle-behavior controller, i.e. a behavior controlling device, 26, and an informing unit, i.e. an informing device, 27.

The sensors 20 are operative to measure various types of information representing the behavior of the vehicle V. For example, the sensors 20 include a yaw-rate sensor, a vehicle-speed sensor, and a steering-angle sensor. The yaw-rate sensor is operative to output, to the controller 10, a signal indicative of an angular velocity around a vertical axis of the vehicle V as a yaw rate of the vehicle V. The vehicle-speed sensor is operative to output, to the controller 10, the speed of the vehicle V. The steering-angle sensor is operative to output, to the controller 10, a signal indicative of a steering angle of the vehicle V.

The navigation apparatus 21 is communicably connected to the controller 10. The navigation apparatus 21 stores therein map information about where the vehicle V can travel. The navigation apparatus 21 is capable of detecting the current location of the vehicle V, i.e. the current location of the center of gravity of the vehicle V, and determining and displaying, on a map at and around the current location of the vehicle V displayed on a monitor thereof, one or more suitable routes to a specified destination from the current location of the vehicle V. This helps the driver to navigate the vehicle V in accordance with a selected one of the suitable routes to the specified destination.

The navigation apparatus 21 is also capable of obtaining, according to instructions sent from the controller 10, own-vehicle road information. The own-vehicle road information includes the slope and curvature of a road at a current location of the vehicle V running on the road, and sending the road information to the controller 10. The navigation apparatus 21 is further capable of obtaining, according to instructions sent from the controller 10, preceding-vehicle road information including (1) The slope and curvature of the same road at a current location of a preceding vehicle running on the same road immediately ahead of the vehicle V (2) The slope and curvature of the same road or another road at a future location of the preceding vehicle where the preceding vehicle is predicted to be running.

The navigation apparatus 21 is capable of sending the own-vehicle road information and the preceding-vehicle road information to the controller 10.

The other-vehicle information obtaining unit 22 is capable of cyclically accessing other vehicles running, being temporarily stopped, or being parked located within an accessible distance around the current location of the vehicle V using known inter-vehicle communications and the other similar communication methods to obtain pieces of information from each of the other vehicles. The pieces of information from the other vehicles include the location and speed of each of the other vehicles, and the locations and speeds of each of further other vehicles located around each of the other vehicles. As the location of each of the other vehicles, the center of gravity of a corresponding other vehicle is for example used. The other-vehicle information obtaining unit 22 is also capable of sending the pieces of information obtained from each of the other vehicles to the controller 10.

The inter-vehicle distance measuring unit 23 is capable of measuring an inter-vehicle distance between the vehicle V and a preceding vehicle running immediately ahead of the vehicle V, and a relative speed between the preceding vehicle and the vehicle V.

For example, the inter-vehicle distance measuring unit 23 includes a camera system provided with a stereo camera attached to, for example, the front center of the vehicle V. The stereo camera picks up three-dimensional images in front of the vehicle V, and the camera system manipulates the three-dimensional images to thereby obtain the inter-vehicle distance and relative speed between the vehicle V and a preceding vehicle just ahead of the vehicle V. The inter-vehicle distance measuring unit 23 can include a radar device operative to transmit probing waves, such as radar waves or laser waves to a predetermined scan region, and receive echoes from at least one object based on the transmitted probing waves. Based on the received echoes, the radar device is operative to obtain the inter-vehicle distance and relative speed between the vehicle V and a preceding vehicle just ahead of the vehicle V. The inter-vehicle distance measuring unit 23 is also capable of sending the inter-vehicle distance and the relative speed of a preceding vehicle immediately ahead of the vehicle V to the controller 10.

The vehicle-behavior controller 26 includes various actuators that control the behavior of the vehicle V. For example, the actuators include an actuator that controls the position of a throttle valve for controlling the amount of air entering an internal combustion engine of the vehicle V. That is, the position of the throttle valve represents how the throttle valve is opened. Controlling the position of the throttle valve controls the speed of the vehicle V. The actuators also include an actuator that individually controls hydraulic pressure to be applied to a brake for each of the wheels of the vehicle V.

The vehicle-behavior controller 26 is communicably connected to the controller 10. The controller 10 instructs the vehicle-behavior controller 26 to adjust the position of the throttle valve and hydraulic pressure to be applied to the brake for each of the wheels. This adjustment controls the inter-vehicle distance and relative speed between the vehicle V and a preceding vehicle immediately ahead of the vehicle V as instructed. The actuators can include an actuator that controls a steering angle of the vehicle V as instructed by the controller 10.

The informing unit 27 is communicably connected to the controller 10, and includes a speaker and a display. The informing unit 27 is capable of giving audible and visible info' illation to the driver of the vehicle V using the speaker and display as instructed by the controller 10.

The controller 10 is mainly comprised of a well-known microcomputer consisting of, for example, a CPU 11 and a memory device 12, which is for example a non-transitory storage medium. The memory device 12 includes at least one of a ROM and a RAM, which are communicably connected to each other. In particular, the memory device 12 includes the RAM, which is a non-volatile memory. Such a non-volatile memory does not need power to retain data.

The CPU 11 performs various drive-assist routines, i.e. various sets of instructions, including an adaptive cruise control (ACC) routine. The adaptive cruise control routine controls the actuators of the vehicle-behavior controller 26 to automatically adjust the speed of the vehicle V so that the vehicle V tracks a preceding vehicle immediately ahead of the vehicle V while maintaining a proper target inter-vehicle distance between the vehicle V and the preceding vehicle. In other words, the adaptive cruise control routine controls at least one of the actuators of the vehicle-behavior controller 26 to maintain an actual inter-vehicle distance measured by the inter-vehicle distance measuring unit 23 at a proper target inter-vehicle distance. The drive-assist routines can include a routine that automatically controls the steering of the vehicle V. The drive-assist routines are stored beforehand in the ROM and/or RAM.

Figure 2A:
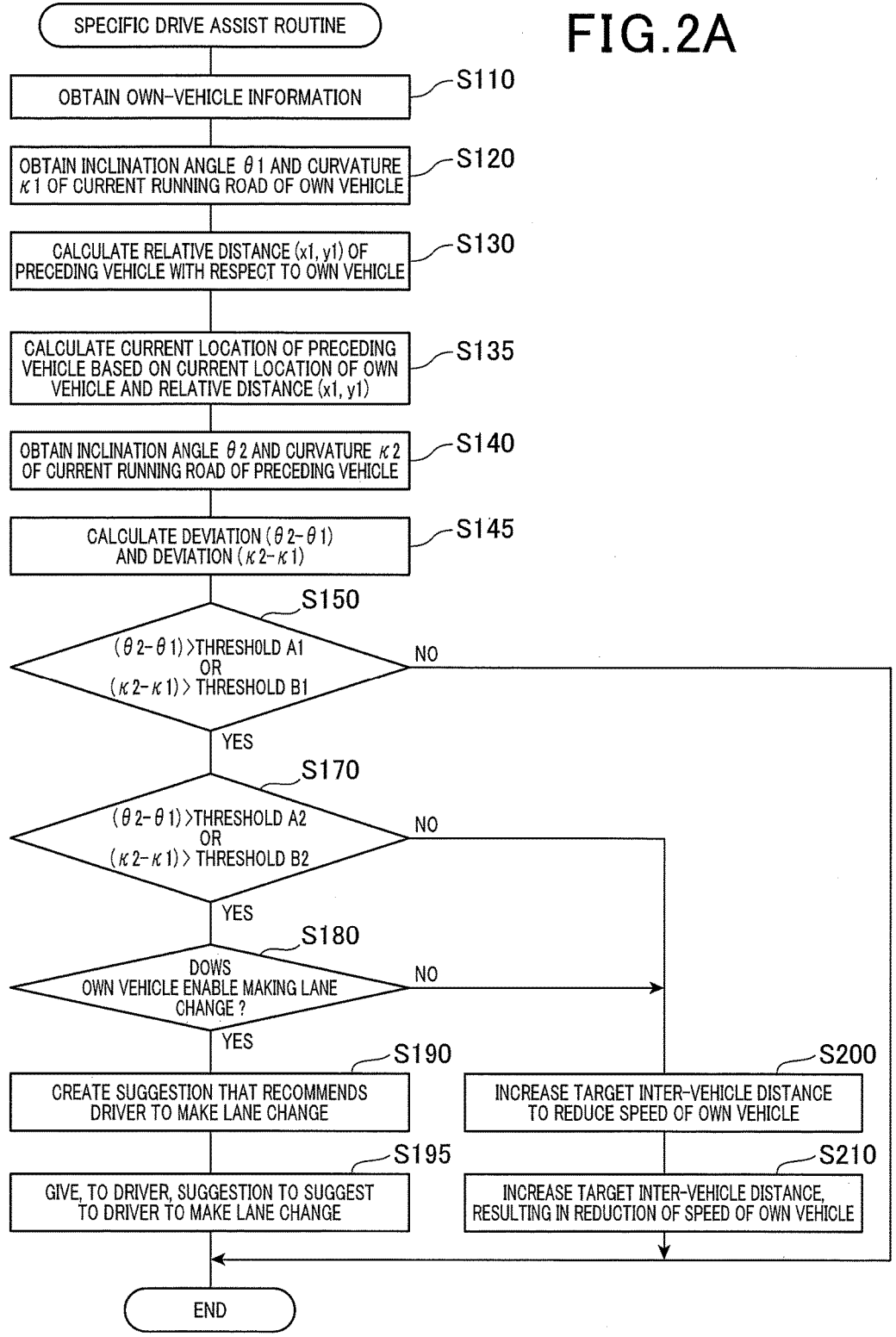
FIG. 2A is a flowchart schematically illustrating a specific drive assist routine carried out by a controller of the drive assist system illustrated in FIG. 1.

Next, operations of the drive assist system 1 according to this embodiment when the drive assist system 1 performs a specific drive-assist routine while executing the adaptive cruise control routine will be described hereinafter with reference to FIG. 2A. The specific drive-assist routine is designed to obtain travelling-condition difference information between a first travelling condition of the vehicle V and a second travelling condition of the preceding vehicle. According to the travelling-condition difference information, the specific drive-assist routine is designed to determine a recommended or suggested behavior of the vehicle V.

While executing the adaptive cruise control routine to maintain a proper target inter-vehicle distance between the vehicle V and a preceding vehicle running immediately ahead of the vehicle V, the CPU 11 starts to perform the specific drive-assist routine when the inter-vehicle distance measuring unit 23 detects a preceding vehicle running ahead of the vehicle V. That is, the CPU 11 cyclically performs the specific drive-assist routine while a preceding vehicle running ahead of the vehicle is detected by the inter-vehicle distance measuring unit 23.

When starting the specific drive-assist routine, the CPU 11 obtains, as own-vehicle information, the current location of the vehicle V from the navigation apparatus 21, and the speed of the vehicle V from the sensors 20 in step S110.

Next, the CPU 11 obtains the slope and curvature of a road at the current location of the vehicle V running on the road according to, for example, the map at and around the current location of the vehicle V obtained by the navigation apparatus 21 in step S120. The slope of the road at the current location of the running vehicle V is expressed as, for example, an inclination angle $\theta 1$ of the road with respect to the horizontal, i.e. the reference horizontal plane, perpendicular to the direction of gravity. The curvature of the road at the current location of the running vehicle V is expressed as, for example, $\kappa 1$. The inclination angle $\theta 1$ of the road and the curvature $\kappa 1$ of the road at the current location of the vehicle V are first travelling-condition parameters representing a first travelling condition of the vehicle V. The first travelling condition, i.e. each of the first travelling-condition parameters, for example shows one or more conditions under which the vehicle V is travelling on the corresponding road.

Note that the sensors 20, the navigation apparatus 21, and the operations in steps S110 and S120 serve as, for example, a first obtaining unit.

Figure 2B:
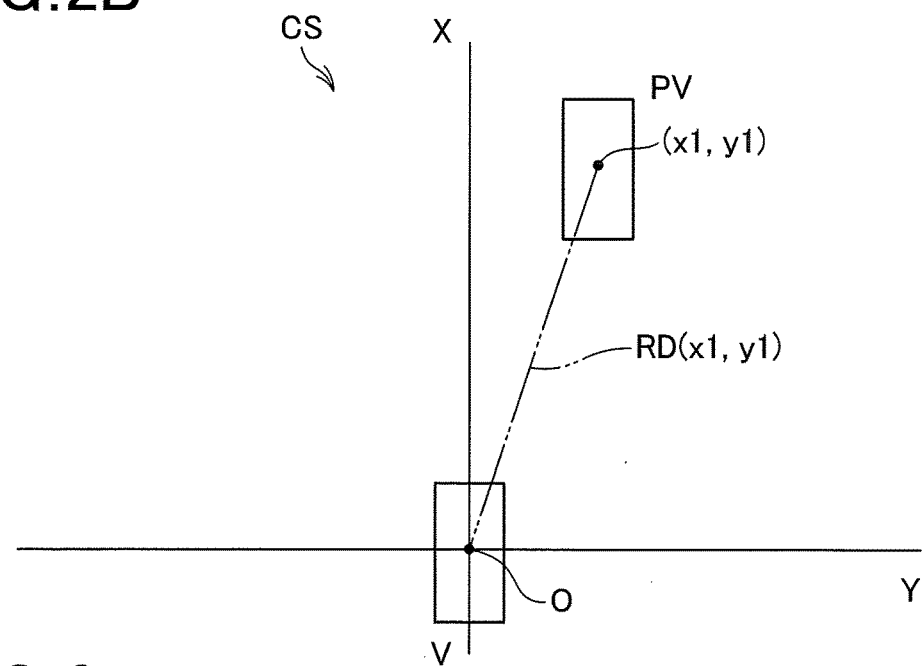
FIG. 2B is a view schematically illustrating a two-dimensional coordinate system defined for the vehicle according to this embodiment.

Following the operation in step S120, the CPU 11 calculates a relative distance from the current location of the vehicle V to the current location of the preceding vehicle in step S130. For example, a two-dimensional coordinate system CS having an origin O corresponding to, for example, the center of gravity of the vehicle V is defined (see FIG. 2B). The vertical axis X of the two-dimensional coordinate system CS is a vertical direction passing through the center of gravity of the vehicle V extending in a longitudinal direction of the vehicle V. The horizontal axis Y of the two-dimensional coordinate system CS is a horizontal direction perpendicular to the vertical direction and parallel to a width direction of the vehicle V. On the two-dimensional coordinate system CS, a coordinate point (x1, y1) corresponding to, for example, the center of gravity of the preceding vehicle (see PV in FIG. 2B) represents a relative distance (RD) of the preceding vehicle with respect to the vehicle V. Hereinafter, the reference character PV is assigned to the preceding vehicle running immediately ahead of the vehicle V.

Specifically, the CPU 11 calculates, as a relative distance RD (x1, y1) from the vehicle V up to the preceding vehicle PV, a relative distance from the center of gravity of the vehicle V up to the center of gravity of the preceding vehicle PV based on the inter-vehicle distance between the preceding vehicle PV and the vehicle V measured by the inter-vehicle measuring unit 23 in step S130. Note that the inter-vehicle distance measured by the inter-vehicle measuring unit 23 can be directly used as the relative distance RD (x1, y1) from the vehicle V up to the preceding vehicle PV. The CPU 11 can calculate the relative distance RD (x1, y1) from the vehicle V up to the preceding vehicle PV based on the current location of the vehicle V obtained by the navigation apparatus 21 and the current location of the preceding vehicle PV obtained by the other-vehicle information obtaining unit 23.

Following the operation in step S130, the CPU 11 calculates the current location of the preceding vehicle PV based on the current location of the vehicle V and relative distance RD (x1, y1) of the preceding vehicle PV with respect to the vehicle V in step S135. Note that, in step S135, the CPU 11 can obtain the current location of the preceding vehicle PV based on the information about the preceding vehicle PV obtained by the other-vehicle information obtaining unit 22.

Next, the CPU 11 obtains, from, for example the map at and around the current location of the preceding vehicle PV obtained by the navigation apparatus 21, the slope and curvature of the same road at the current location of the preceding vehicle PV running ahead of the vehicle V on the same road in step S140. The slope of the road at the current location of the preceding vehicle PV is expressed as, for example, an inclination angle $\theta 2$ with respect to the reference horizontal plane perpendicular to the direction of gravity. The curvature of the road at the current location of the preceding vehicle PV is expressed as, for example, $\kappa 2$.

The inclination angle $\theta 2$ of the road and the curvature $\kappa 2$ of the road at the current location of the preceding vehicle PV are second travelling-condition parameters representing a second travelling condition of the preceding vehicle PV. The second travelling condition, i.e. each of the second travelling-condition parameters, for example shows one or more conditions under which the preceding vehicle PV is travelling on the corresponding road.

Note that the polarity of each of the inclination angles $\theta 1$ and $\theta 2$ is defined such that the ascending side of the corresponding slope with respect to the horizontal represents a positive side, and the descending side of the corresponding slope with respect to the horizontal represents a negative side.

For example, the other-vehicle information obtaining unit 22, the inter-vehicle distance measuring unit 23, and the operations in steps S130, S135, and S140 serve as a second obtaining unit.

Following the operation in step S140, the CPU 11 calculates the deviation $(\theta 2-\theta 1)$ of the inclination angle $\theta 1$ from the inclination angle $\theta 2$, and the deviation $(\kappa 2-\kappa 1)$ of the curvature $\kappa 1$ of the road at the current location of the vehicle V from the curvature $\kappa 2$ of the road at the current location of the preceding vehicle PV in step S145. The operation in step S145 of the CPU 11 serves as, for example, a deviation calculator.

Then, the CPU 11 determines whether the deviation $(\theta 2-\theta 1)$ is more than a predetermined first inclination threshold A1, and whether the deviation $(\kappa 2-\kappa 1)$ is more than a predetermined first curvature threshold B1 while the speed of the vehicle V is equal to or higher than a predetermined reference speed in step S150.

Figure 3:
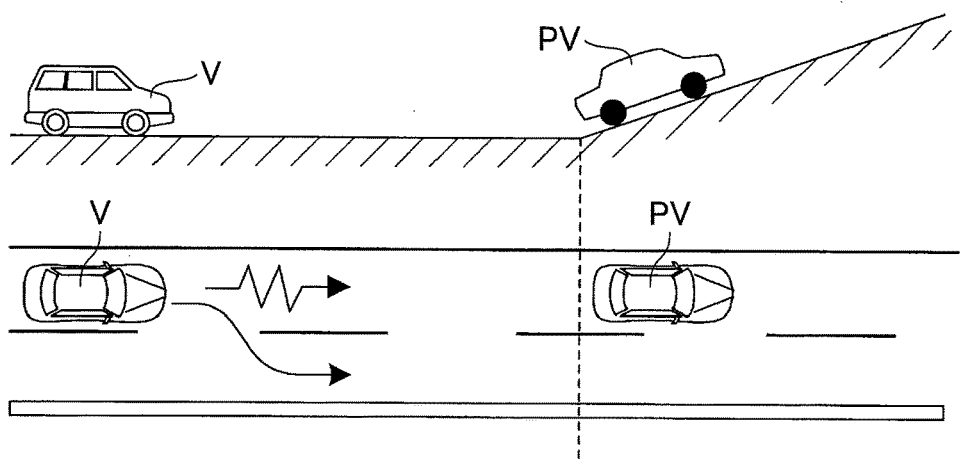
FIG. 3 is a plan view schematically illustrating an example of a situation where a preceding vehicle, which is running ahead of an own vehicle, is entering a rising slope.

Note that each of the first inclination threshold A1 represents a criterion of determination of whether the preceding vehicle PV is likely to reduce its speed and the speed reduction requires the vehicle V to reduce its speed or overtake the preceding vehicle PV because the preceding vehicle PV is about to run at a rising slope of a road. For example, when the preceding vehicle PV is entering a rising slope of the road while the vehicle V is running at a flat portion of the road (see FIG. 3), there is a high probability of the preceding vehicle PV reducing its speed. That is, an increase of the deviation $(\theta 2-\theta 1)$ from the first inclination threshold A1 results in the preceding vehicle PV probably reducing its speed.

Figure 4:
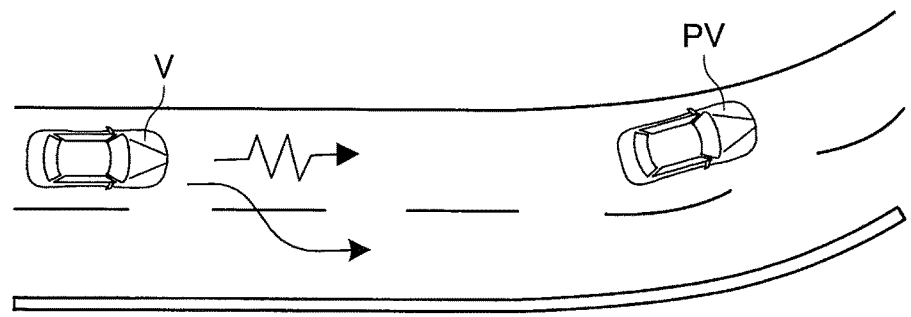
FIG. 4 is a plan view schematically illustrating an example of a situation where a preceding vehicle, which is running ahead of an own vehicle, is entering a curve.

The first curvature threshold B1 represents a criterion of determination of whether the preceding vehicle PV is likely to reduce its speed and the speed reduction requires the vehicle V to reduce its speed or overtake the preceding vehicle PV because the preceding vehicle PV is about to run at a curve of a road. For example, when the preceding vehicle PV is entering a curve of the road while the vehicle V is running at a straight portion of the road (see FIG. 4), there is a high probability of the preceding vehicle PV reducing its speed. That is, an increase of the deviation $(\kappa 2-\kappa 1)$ from the first curvature threshold B1 results in the preceding vehicle PV probably reduces its speed.

The reduction may increase the probability of an actual inter-vehicle distance between the vehicle V and the preceding vehicle PV being not maintained at the target inter-vehicle distance.

Thus, the controller 10 of the drive assist system 1 according to this embodiment is configured to prepare for maintaining the actual inter-vehicle distance between the vehicle V and the preceding vehicle PV being not maintained at the target inter-vehicle distance before the actual inter-vehicle distance changes to deviate from the target inter-vehicle distance.

Specifically, when it is determined that neither the deviation $(\theta 2-\theta 1)$ is more than the first inclination threshold A1 nor the deviation $(\kappa 2-\kappa 1)$ is more than the first curvature threshold B1 (NO in step S150), the specified drive assist routine is terminated.

Otherwise, when it is determined that the deviation $(\theta 2-\theta 1)$ is more than the first inclination threshold A1 or the deviation $(\kappa 2-\kappa 1)$ is more than the first curvature threshold B1 (YES in step S150), the specified drive assist routine proceeds to step S170.

In step S170, the CPU 11 determines whether the deviation $(\theta 2-\theta 1)$ is more than a predetermined second inclination threshold A2, and whether the deviation $(\kappa 2-\kappa 1)$ is more than a predetermined second curvature threshold B2. Note that each of the second inclination threshold A2 and the second curvature threshold B2 is set to be more than a corresponding one of the first inclination threshold A1 and the first curvature threshold B1.

Note that each of the second inclination threshold A2 and the second curvature threshold B2 is a criterion of how much the preceding vehicle PV reduces its speed. That is, the controller 10 changes a recommended behavior for the vehicle V according to determination of whether the deviation $(\theta 2-\theta 1)$ is more than the second inclination threshold A2, and whether the deviation $(\kappa 2-\kappa 1)$ is more than the second curvature threshold B2.

Specifically, when it is determined that neither the deviation $(\theta 2-\theta 1)$ is more than the second inclination threshold A2 nor the deviation $(\kappa 2-\kappa 1)$ is more than the second curvature threshold B2 (NO in step S170), the specified drive assist routine proceeds to step S200 described later.

Otherwise, when it is determined that the deviation $(\theta 2-\theta 1)$ is more than the second inclination threshold A2 or the deviation $(\kappa 2-\kappa 1)$ is more than the second curvature threshold B2 (YES in step S170), the specified drive assist routine proceeds to step S180.

In step S180, the CPU 11 determines whether the vehicle V enables making a lane change with consideration of all the following pieces of information (1) There is an overtaking lane provided adjacent to the current road in front of the vehicle V obtained by the navigation apparatus 21

(2) The location and speed of each of other vehicles running or being parked around the vehicle V or the preceding vehicle PV obtained by the other-vehicle information obtaining unit 22

(3) The relative speed between the vehicle V and the preceding vehicle PV obtained by the inter-vehicle distance measuring unit 23.

When it is determined that the vehicle V enables making a lane change (YES in step S180), the CPU 11 creates, as a suggestion, audible and visible information that recommends the driver driving the vehicle V to change the current running lane to an overtaking lane provided adjacent to the current running lane in order to pass the preceding vehicle PV in step S190.

Then, the CPU 11 instructs the informing unit 27 to give, to the driver of the vehicle V, the suggestion using the speaker and the display in step S195. This suggests that the driver driving the vehicle V should change the current running lane to the overtaking lane, thus passing the preceding vehicle PV.

Otherwise, when it is determined that the vehicle V disables making a lane change (NO in step S180), the CPU 11 sets a value of the target inter-vehicle distance to a new value greater than the previous value in step S200. This results in the CPU 11 controlling at least one of the actuators of the vehicle-behavior controller 26 to reduce the speed of the vehicle V down to a value required to maintain the actual inter-vehicle distance measured by the inter-vehicle distance measuring unit 23 at the new value of the target inter-vehicle distance in step S210. In other words, this control causes the vehicle V to track the preceding vehicle V with the new value of the target inter-vehicle distance. After completion of the operation in step S210, the CPU 11 terminates the specified drive assist routine.

In particular, the CPU 11 increases a value of the inter-vehicle distance of the vehicle V with respect to the preceding vehicle PV as at least one of the deviation ($\theta2-\theta1$) and the deviation ($\kappa2-\kappa1$) increases in steps S200 and S210. In other words, the CPU 11 causes the rate of reduction in the speed of the vehicle V to increase as at least one of the deviation ($\theta2-\theta1$) and the deviation ($\kappa2-\kappa1$) increases in steps S200 and S210.

Note that the operations in steps S150, S170, S180, S190, and S200 serve as, for example, a behavior determiner, and the operations in steps S195 and S210 serve as, for example, a controller.

After completion of the operation in step S210, the CPU 11 terminates the specified drive assist routine.

As described above, the controller 10 of the drive assist system 1 obtains, from the navigation apparatus 21, at least one first travelling-condition parameter including at least one of the slope and curvature of the road on which the vehicle V is currently running in step S120. Additionally, the controller 10 obtains, from the navigation apparatus 21, at least one second travelling-condition parameter including at least one of the slope and curvature of the road on which the preceding vehicle PV is currently running in step S140.

Then, the controller 10 calculates the deviation, i.e. the difference, between the at least one first driving condition parameter and the corresponding at least one second driving-condition parameter (see step S145). According to the deviation between the at least one first driving condition parameter and the corresponding at least one second driving-condition parameter, the controller 10 determines a recommended behavior of the vehicle V that responses the deviation (see steps S150 to S190, and S200). Then, the controller 10 causes, i.e. controls, a device associated with the behavior of the vehicle V and included in the vehicle V to act in the recommended behavior in response to the deviation (see step S195 or S210).

Calculating the deviation between the at least one first driving condition parameter and the corresponding at least one second driving-condition parameter enables the controller 10 to predict a situation where the inter-vehicle distance between the vehicle V and the preceding vehicle PV is likely to change before the inter-vehicle distance actually changes. Determining a recommended behavior of the vehicle V based on the deviation, i.e. the predicted situation, reduces the delay between change of the inter-vehicle distance and an action of the vehicle V based on the recommended behavior of the vehicle V.

In particular, the controller 10 determines whether the deviation between the at least one first driving condition parameter and the corresponding at least one second driving-condition parameter is more than a predetermined threshold while the speed of the vehicle V is equal to or higher than the predetermined reference speed (see step S150). When it is determined that the deviation is more than the predetermined threshold, the controller 10 determines a first recommended behavior of the vehicle V that suggests that the driver of the vehicle V should pass the preceding vehicle PV (see steps S170, S180, S190, and S195). Otherwise, when it is determined that the deviation is equal to or less than the predetermined threshold, the controller 10 determines a second recommended behavior of the vehicle V that causes the vehicle V to travel while tracking the preceding vehicle PV (see steps S170, S200, and S210).

In other words, the controller 10 predicts the deviation between the at least one first driving condition parameter and the corresponding at least one second driving-condition parameter as a vehicle-speed parameter indicative of change in the speed of the preceding vehicle PV. When it is determined that the vehicle-speed parameter is more than the predetermined threshold, the controller 10 determines that the speed of the preceding vehicle PV is likely to change widely. Then, the controller 10 determines the first recommended behavior of the vehicle V that suggests that the driver of the vehicle V should pass the preceding vehicle PV (see steps S170, S180, S190, and S195). Otherwise, when it is determined that the vehicle-speed parameter is equal to or less than the predetermined threshold, the controller 10 determines that the speed of the preceding vehicle PV is likely to change relatively small. Then, the controller 10 determines the second recommended behavior of the vehicle V that causes the vehicle V to travel while tracking the preceding vehicle PV (see steps S170, S200, and S210).

This configuration therefore determines one of the first recommended behavior and the second recommended behavior so as to maintain the speed of the vehicle V at the reference speed as equal as possible.

The controller 10 of the drive assist system 1 is configured to (1) Obtain, as the at least one first travelling-condition parameter, at least one of the slope and curvature of the road at the current location of the vehicle V (see step S120)

(2) Obtain, as the at least one second travelling-condition parameter, at least one of the slope and curvature of the road at the current location of the preceding vehicle PV (see step S140).

This configuration enables the controller 10 to reliably predict the change in the speed of the preceding vehicle V as early as possible.

The controller 10 of the drive assist system 1 obtains the current location of the vehicle V from the navigation apparatus 21 (see step S110), and relative positional information, i.e. the relative distance, of the preceding vehicle V with respect to the current location of the vehicle V (see step S130). Then, the controller 10 calculates the current location of the preceding vehicle PV based on the relative positional information and the current location of the vehicle V (see step S140). According to the map at and around the current location of the preceding vehicle PV, the controller 10 obtains a state of the current road at and around the current location of the preceding vehicle PV as the second travelling condition of the preceding vehicle PV (see step S140).

This configuration obtains the second travelling condition of the preceding vehicle PV in the own vehicle V without obtaining information from the preceding vehicle PV.

Additionally, the controller 10 of the drive assist system 1 determines the second recommended behavior of the vehicle V such that the rate of reduction in the speed of the vehicle V rises as the deviation between the at least one first driving condition parameter and the corresponding at least one second driving-condition parameter increases. In other words, the controller 10 of the drive assist system 1 determines the second recommended behavior of the vehicle V such that the inter-vehicle distance of the vehicle V with respect to the preceding vehicle PV increases as the deviation between the at least one first driving condition parameter and the corresponding at least one second driving-condition parameter increases (see steps S200 and S210).

This configuration predicts that the preceding vehicle PV will reduce its speed widely with a rapid increase of the deviation between the at least one first driving condition parameter and the corresponding at least one second driving-condition parameter. Then, this configuration determines the second recommended behavior that increases the rate of reduction in the speed of the vehicle V, thus increasing the actual inter-vehicle distance of the vehicle V with respect to the preceding vehicle PV. This configuration therefor effectively responds to a rapid reduction in the speed of the preceding vehicle PV.

The controller 10 of the drive assist system 1 instructs the informing unit 27 to give, to the driver of the vehicle V, the suggestion using the speaker and the display in step S195. This guides the driver of the vehicle V to drive the vehicle V in accordance with the given suggestion.

The present disclosure is not limited to this embodiment set forth above. Various modifications identified by the words described in the following claims can be included in other embodiments of the present disclosure as long as they can be within the scope of the present disclosure.

The drive assist system 1 according to this embodiment can be configured to predict a value of the second travelling condition of the preceding vehicle PV at a future location where the preceding vehicle will be travelling at a future time. The future time is defined by lapse of a predetermined time since the current running time. In other words, the second travelling condition of the preceding vehicle PV, which shows one or more conditions under which the preceding vehicle PV is travelling, includes a value thereof at a future location where the preceding vehicle will be travelling at a future time.

Specifically, the CPU 11 can be configured to obtain the speed of the preceding vehicle PV according to the relative distance of the vehicle V with respect to the preceding vehicle PV or information indicative of the speed of the preceding vehicle PV from the other-vehicle information obtaining unit 22 in step S130. Then, the CPU 11 can be configured to predict a future location of the preceding vehicle PV at a future time defined by a predetermined time Ti after the current running time according to the obtained speed and the current location of the preceding vehicle PV. Thereafter, the CPU 11 can be configured to obtain, from the navigation apparatus 21, the slope and the curvature of the preceding vehicle PV at the future time.

This configuration enables the controller 10 to predict the change in the speed of the preceding vehicle V as further early as possible.

The controller 10 of the drive assist system 1 instructs the informing unit 27 to give, to the driver of the vehicle V, the suggestion using the speaker and the display in step S195, but the present disclosure is not limited thereto. Specifically, in step S195, the CPU 11 can control at least one of the actuators of the vehicle-behavior controller 26 to automatically drive the vehicle V to change the current running lane to the overtaking lane, thus passing the preceding vehicle PV in accordance with the suggestion deter mined in step S190. This modification enables the controller 10 to automatically control the behavior of the vehicle V using the vehicle-behavior controller 26 in accordance with the suggestion determined in step S190.

The controller 10 of the drive assist system 1 is configured to increase the target inter-vehicle distance of the vehicle V with respect to the preceding vehicle PV to result in reduction of the speed of the vehicle V in steps S200 and S210, but the present disclosure is not limited thereto. Specifically, the controller 10 can be configured to, for example, reduce a target speed of the vehicle V corresponding to the target inter-vehicle distance between the vehicle V and the preceding vehicle PV.

The controller 10 of the drive assist system 1 can be configured to perform the operations in step S190 or S200 after an affirmative determination in step S150 while skipping the operations in steps S170 and S180.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for assisting drive of an own vehicle travelling on a road, the apparatus comprising:
    a first curvature obtaining unit configured to obtain a curvature of the road at a first location of the road, the first location being associated with the own vehicle;
    a second curvature obtaining unit configured to obtain a curvature of the road at a second location of a preceding vehicle travelling on the road immediately ahead of the own vehicle, the second location being associated with the preceding vehicle;
    a behavior determiner configured to:
        calculate a deviation between the first curvature of the own vehicle and the second curvature of the preceding vehicle; and
        determine a recommended behavior of the own vehicle in accordance with the calculated deviation such that an inter-vehicle distance between the preceding vehicle and the own vehicle is maintained; and
    a control unit configured to control the own vehicle based on the recommended behavior of the own vehicle.

2. The apparatus according to claim 1, further comprising:
    an own vehicle location obtaining unit configured to obtain a current location of the own vehicle; and
    a relative location obtaining unit configured to obtain a relative location of the preceding vehicle with respect to the current location of the own vehicle,
    wherein the second curvature obtaining unit is configured to:
        obtain a current location of the preceding vehicle in accordance with the relative position; and
        obtain, as the second curvature, a curvature of the road at the current location of the preceding vehicle in accordance with previously prepared map info' illation including the curvature of the road at the current location.

3. The apparatus according to claim 1, wherein:
the second curvature obtaining unit is configured to:
　obtain a future location of the preceding vehicle at a future location where the preceding vehicle will be travelling at a future time, the future time being defined by lapse of a predetermined time since a current travelling time of the preceding vehicle; and
　obtain, as the second curvature, a curvature of the road at the future location of the preceding vehicle.

4. The apparatus according to claim 1, wherein:
the behavior determiner is configured to determine the recommended behavior of the own vehicle such that a rate of speed reduction of the own vehicle or the inter-vehicle distance between the preceding vehicle and the own vehicle increases as the deviation between the first curvature and the second curvature increases.

5. The apparatus according to claim 1, wherein:
the behavior determiner is configured to determine the recommended behavior of the own vehicle on a condition that the own vehicle is travelling at a speed higher than a predetermined reference speed.

* * * * *